(12) United States Patent
Yasukura (10) Patent No.: US 6,625,733 B1
(45) Date of Patent: Sep. 23, 2003

(54) ELECTRONIC INFORMATION INQUIRY METHOD

(76) Inventor: Yutaka Yasukura, 15-22 Katutadai-minami 2-chome, achiyo-shi, Chiba 276-0025 (JP)

( * ) Notice: Subject to any disclaimer, the term of this patent is extended or adjusted under 35 U.S.C. 154(b) by 0 days.

(21) Appl. No.: 09/830,336

(22) PCT Filed: Jan. 13, 2000

(86) PCT No.: PCT/JP00/00121

§ 371 (c)(1),
(2), (4) Date: Apr. 26, 2001

(87) PCT Pub. No.: WO01/52128

PCT Pub. Date: Jul. 19, 2001

(51) Int. Cl.$^7$ .............................................. G06F 12/14
(52) U.S. Cl. .......................... 713/200; 380/255; 380/28
(58) Field of Search ................................ 713/200, 201, 713/202; 705/26, 64; 580/229, 232, 255, 28

(56) References Cited

U.S. PATENT DOCUMENTS 5,437,049 A * 7/1995 Carlstedt ..................... 395/800
5,937,158 A * 8/1999 Uranaka ..................... 713/200

FOREIGN PATENT DOCUMENTS

JP         10-177341        6/1998
JP         11-053559        2/1999

OTHER PUBLICATIONS

Takeoki, "Authentication Technology Directs Perfect Virtual Community", Computer & Network LAN, OHM (Oct. 1997), vol. 15, No. 10, pp. 12–16.

* cited by examiner

Primary Examiner—James P. Trammell
Assistant Examiner—Pierre E Elisca
(74) Attorney, Agent, or Firm—Fleshner & Kim, LLP (57) ABSTRACT

A reference A divides the stored electronic information $C_A$ into more than one information element based on a dividing algorithm D ($a_D$) applied with a dividing argument $a_D$, selects information elements from the divided elements and generates a transmittal information block E based on a selecting algorithm S ($a_S$) applied with a selecting argument $a_S$, and sends the transmittal information block E accompanied with the arguments ($a_D$, $a_S$) to an inquirer B, and the inquirer divides the stored electronic information $C_B$ into more than one information element and selects a part of the divided elements based on the same dividing and selecting algorithms D ($a_D$), S ($a_S$) as used by the reference A applied with the arguments ($a_D$, $a_S$), replaces the selected elements with the information elements included in the transmittal information block E so as to form the third electronic information $C_I$, and compares it with the stored electronic information $C_B$ to confirm identity between two of the electronic information $C_A$ and $C_B$.

3 Claims, 5 Drawing Sheets

ELECTRONIC INFORMATION INQUIRY METHOD

This application claims priority of PCT/JP00/00121, filed Jan. 13, 2000.

TECHNICAL FIELD

This invention relates to a safe security method in recording or exchanging electronic information, especially an inquiry process for confirming mutual electronic information maintaining the same content each other when the both parties should retain the same information in exchange of the electronic information or in electronic commerce.

BACKGROUND ARTS

Many computers are connected to communications networks for forming computer systems in recent years, and each computer may be accessed by many uncertified persons through the communications networks. Therefore, the electronic information recorded in the external memory storage of the computer such as hard disk devices may be falsified by others having no rights. Alterations may be occurred by accidents without willfulness of others, and also even the parties may commit falsification or forgery of the information.

Thus, important contents should be always doubted whether the electronic information recorded in the apparatus maintains truth or not. In electronic commerce, problems may occur afterwards when someone has transactions believing an altered electronic information changed by an accident, willful, or fault which records the contracting condition agreed by each other.

To avoid such problems, it is required to confirm agreement of the content of the records held by the both parties as the occasion demands. For confirming agreement of the electronic information held by both parties, it is enough to exchange the electronic information each other and to compare the received information with the information maintained. However, it is preferable to avoid letting full of the electronic information run in the communications channels for preventing from leakage of the information to others, when secrecy of the information is required.

When there is a difference between the contents recorded by each other, it comes into question which is true and it might become a futile discussion. It is desirable to be judged by a neutral third party such as a notary public or an authentication authority etc. If full of the information runs through the channels for judgment of genuineness of the information, the information may be stolen along the communications channels. And high ability and long time for processing are required as well as congestion occurs in the communications channels because of a vast quantity of the running information. Especially, an authentication authority or a database center who has to communicate with many customers through the communications channels, has such disadvantages that the equipment cost rises high and also number of the customers are restricted.

Therefore, it is an object of the invention to provide an inquiry system for confirming the identity of the information retained in each other by exchanging only a part of the electronic information.

It is another object of the invention to provide an inquiry system for confirming the genuineness of the electronic information retained by one self by asking only small parts of the information deposited in an authentication party.

It is a further object of the invention to provide an inquiry system for obtaining a genuine electronic information by putting together the information furnished from the authority who retained only a part of the electronic information and the information held by one's self which is the other part of the electronic information.

DISCLOSURE OF INVENTION

According to the electronic information inquiry method of this invention, the parties concerned as a reference, or a collator divides the recorded electronic information into more than one information element, and selects some elements from the divided ones for a transmittal information block. Furthermore, the reference generates division/selection data recorded with the dividing manner into the information elements, the generating manner of the transmittal information block and the selected information elements. Then the reference sends the transmittal information block and the division/selection data to the inquirer who requests the collation.

A division/selection data is necessary data for dividing and combining to form the transmittal information block, and the division/selection data is transmitted with the transmittal information block. The division/selection data includes information of location, length and so on, as well as a sum check data of the individual information elements included in the transmittal information block. The division/selection data may be accompanied with each of the information elements. The information elements may be relocated with a random order in the information block. The transmittal information block may be formed with more than one information block, and the individual information blocks may be transmitted separately.

The inquirer receives the transmittal information block or blocks and the division/selection data, divides the electronic information file recorded in his device according to the division/selection data, replaces the parts by the transmittal information located corresponding to their locations, and rearranges and integrates the information elements according to the division/selection data in order to retrieve the information content.

A transmittal information block is formed by combining some elements arbitrarily selected from the discretely divided information elements. Therefore, even a part of any information block includes some portion relating to any part of the whole information. The transmittal information blocks are not available unless they are retrieved as like a paper media treated by a shredder. Therefore, the transmittal information is safe because anyone without a retrieving means cannot utilize the information blocks as a useful information.

When the information recorded by the inquirer is not agree with the information recorded in the reference, the information content which is retrieved from the inquirer's electronic information file partly replaced with the information elements in the transmittal information block is seldom or never equal to the information content recorded by the inquirer, even though the different part of the information is not transmitted.

Especially when information elements which are formed by dividing the electronic information at arbitrary physically defined points are used, it is impossible to know its content by obtaining some of the divided information elements. Even if there is very little difference between the both information, at least some information elements have a difference because the later part of the information differs from each other. Therefore, a meaningful content cannot be obtained by replacing with information elements in the transmittal information block to retrieve the whole information, so that it is easily made sure if there is difference unless comparing the retrieved information with the original.

The both parties commonly may store the same division/selection algorithm, so that the both parties may obtain the same division/selection meanings if the same argument is applied. This manner makes simpler the division/selection data to be transmitted, and the argument itself unusable by a person who does not know the algorithm. A numerical value relating to the time of inquiry may be used as the argument. When the argument functions as a time stamp, time of alteration can be roughly estimated because the time of collation may be confirmed by each other. The argument may be selected corresponding to the address of reference. The address settles the law which the contract should conform. Thus, the inquiry method of the invention prevents a dispute with regard to the result of the contract, because the parties confirm and agree with each other the contract content, place and time of the conclusion, and so on.

As described above, according to the method of this invention, transmission of very little portion of information to be collated makes sure of the equality of the inquirer's information to the reference's information. And the danger to leak the information as meaningful information during communication is decreased.

Moreover, the method of the invention requires little capacity of the communication channel for collation and little capacity of the calculating ability, so that an organization having a large number of collations such as a certification office may simplify its facilities and enforce its handling ability.

When the electronic information inquiry method of this invention is applied to written contracts, there are less burdens for communication and treating facilities and less dangers to leak the content, of contract to the third parties, because an electronic information file is to be exchanged which includes very little portion of the contract arranged in subtraction order or rearranged in random order, and moreover they can confirm if the recorded content of the contract maintains the same original content.

When a system is used in which a third organization such as a certificate authority or a notary office certificates sameness of the electronic information in order to eliminate disputes among the parties concerned, the third organization holds the whole content of the contract and, according to the method of this invention, the organization forms the transmittal information block and transfers it at request of collation, so that small quantity of information is to be sent and load of the communication path may be decreased. And also the organization may hold only the first transmittal information block and collate them through the first made division/selection data. In this case, the third organization may work by maintaining very small amount of information.

Furthermore, the party concerned, the other party and/or the third party may share separate portions of the divided electronic information, and utilize the information on demand by transmitting the portion to each other and combining them. For example, a card records a part of a certification information is recorded and an authentication authority records the other part of the information, and when the first party inquires the authentication authority for collation, the authority sends the rest part of the information to the first party and the first party combines his held information and the sent information to retrieve the complete certification information, and the first party can confirm truth of a provided certificate by comparing with the retrieved information.

When the above-described method is applied to cipher keys or cryptograms, the third parties cannot embezzle the information because they cannot retrieve the original information unless he holds the part of the information which the first party shares and thus the information running on the communications channels has no value.

Sellers of Software can use the method of this invention to check change of the contents during on-line transmitting their programs and to periodically check alteration programs and databases delivered to their users. They can execute the checks very effectively because very little portion of the electronic information even though the programs or databases are vast enough.

Furthermore, using the method of this invention, miller information of the miller servers can be confirmed to be equal to the one in the original server by exchanging only a small portion of the information.

The method of this invention may be used as electronic check system. The bank issues an electronic checkbook to its client by transmitting one part of the check issue information which is divided in two parts, and the bank holds the remaining part of the information.

When the client uses the electronic check in a virtual shopping mall, the shop inquires the bank if the information on the received check is true. The bank sends the remaining information other than the check holds to the shop, and then the shop can confirm the truth of the check by combining the information in the electronic check and the information in the bank. In other way, the shop sends the bank the information in the check and the bank confirms truth of the information. Thus, highly reliable electronic checks may be utilized by exchanging only very small quantity of information. The client can carry a card recorded with the electronic check and use it in a real shop.

The inquiry system of this invention can be used in patient's medical sheets. The patient holds a card recorded with a part of his medical information. When he sees a doctor in a journey, for example, the doctor inquires the remaining part of the medical information to the hospital which made the medical sheet and combines the received information with the recorded information in the card to complete the full medical information for the new doctor to consult it.

According to the above-mentioned inquiry system for medical information, even though a rather large portion of the medical information is recorded in a portable card, other persons cannot know the patient's secret because they cannot recognize the contents by seeing the card's information. A permitted doctor retrieves the full record gathering the most part from the card and rather small part from a person who made the medical information through the communications channel. Thus, it is an advantage of the system to decrease quantity of communication. And according to this inquiry system for medical information, the doctor may select the proper medical treatment after confirming the true holder of the card.

Furthermore, according to the inquiry system of the invention, it is not required to flow a privacy of the patient through communications channels, so that the hospitals using electronic medical sheets can operate the system through usual information terminals connecting communication networks without fearing invasion of patients' privacy.

The second electronic information inquiry system of this invention is characterized that an electronic information is divided in two parts, an inquirer and a reference hold one part and the rest of the part respectively, the inquirer sends his held part of the information to the reference, the reference combines his held part of the information and the received part to conform a full body of electronic information, the reference checks if the combined information is the same as the original one and sends the check result to the inquirer.

Even in a case the inquirer or the reference does not keep the original electronic information as it was, one can easily recognize that the information fragments held each other originate from the same electronic information, by combining both of the information fragments for retrieval according to the invention, and checking if the retrieved electronic information has a meaningful content.

BEST MODE FOR CARRYING OUT THE INVENTION

The electronic information inquiry method of the invention is a method for confirming that electronic information has not changed during storage or transmission of the electronic information files.

The method of the invention is a method to confirm its sameness of the both records when necessary, especially when the parties concerned should have the same records respectively, and it enables to confirm the sameness of the records by exchanging a small part of the information but not the whole information. According to the method, only a small amount of the information is to be exchanged, and embezzlement and leakage of the information are eliminated because only a part of the information runs through the communications channel.

The method of the invention may also be used in a notary office system in which a party concerned deposits an original document and inquires certification of its content when necessary. It is an advantage to ease the communications burden and to reduce the necessary record capacity for the notary office.

Embodiments of the invention will be described with reference to the appended drawings.

Figure 1:
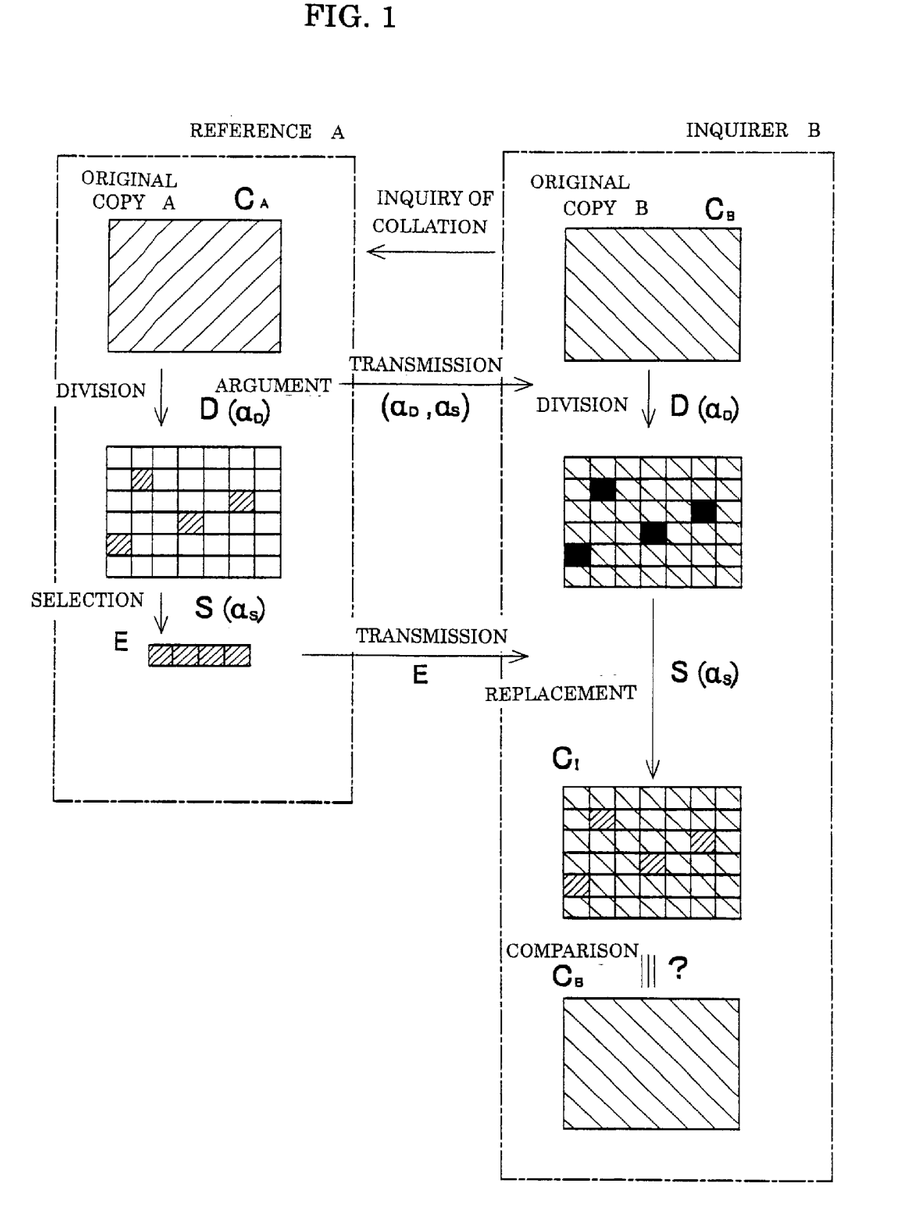
FIG. 1 is a block diagram illustrating the concept of the electronic information inquiry method of the invention.
Figure 2:
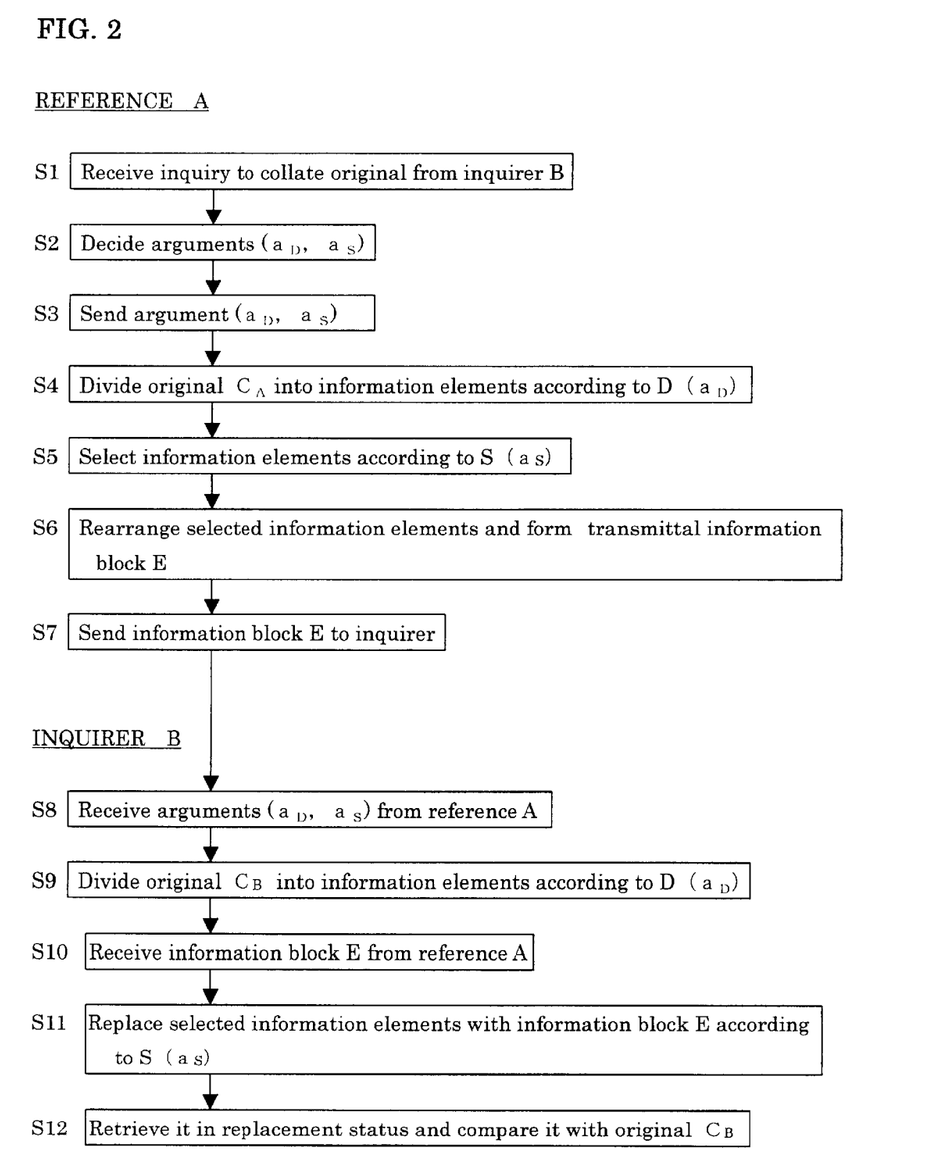
FIG. 2 is a flow diagram illustrating an embodiment of the inquiry method of the invention.

FIG. 1 is a block diagram illustrating the concept of the invention, and FIG. 2 is a flow diagram illustrating its procedure. FIG. 1 and FIG. 2 illustrate an example of the electronic information inquiry method of this invention confirming that the record content recorded by the first party is the same as the record recorded by the other party.

Assuming party A and party B once made a contract and recorded the same records each other as the written contract. Party B feels necessity of confirming his own recorded copy $C_B$ to be the same as the recorded copy by party A, when party B is going to execute his duty according to the contract. Then, party B inquires party A to collate his recorded copy.

When the reference party A receives request of collation of the recorded copy from the inquirer party B (step 1), the reference A decides arguments ($a_D$, $a_S$) to be used in the processing algorithm for dividing his recorded copy $C_A$ and selecting elements (step 2). The arguments ($a_D$, $a_S$) are sent to the inquirer B (step 3).

The recorded copy $C_A$ is divided into more than one information elements according to the division algorithm D ($a_D$) applied with division argument $a_D$ (step 4). For example, the recorded copy may be divided into several hundreds of information elements. It is preferable for security of the information in communications to divide the electronic information at any physical points in the queue of bit-data, rather than to divide it according to blocks having some meaningful concepts.

Then, some elements are selected among the divided information elements according to the selection algorithm S ($a_S$) applied with selection argument as (step 5). The selected elements are preferably distributed throughout the whole electronic information.

A transmittal information block E is formed by rearranging the selected information elements (step 6). The transmittal information block is only a small part of the original document $C_A$, thus the communications channel is effectively decreased with transportation of information quantity because it is rather small than the original information quantity. And any other person who thefts the information from the communications channel cannot retrieve the original information because it is missing most of the original concept. The selected information elements may be suitably scrambled and the arrangement of the elements may be specified by the selection algorithm S ($a_S$). The information can be more secured in communications by scrambling or ciphering the information. And it may be enough to divide the information into only two parts when a moderate security is enough. The electronic information without scrambling is advantageous to be easy to read.

The arguments may be specified relating to the time of the division. According to the above method, the time of collation is settled as a time stamp, so that the time having maintained with equality will be clear if there is a dispute about the equality, afterwards. The arguments may be used with values relating to the place where the inquirer or the reference exists. According to the system, it will be clearly decided the country whose law the contracts should be based upon.

Both of the parties may exchange their transmittal information blocks each other to determine the equality of their recorded electronic information. In this case, it is preferable to make the arguments relating to the time of collation and to record them as time stamps, so that the arguments may be used as evidence that the both contents were agreed with each other at the time.

The transmittal information block E is sent to the inquirer B (step 7). The arguments ($a_D$, $a_S$) may be sent at the same time as sending the transmittal information block E.

The inquirer B receives the arguments ($a_D$, $a_S$) sent from the reference A (step 8), and divides his recorded copy $C_B$ at the same points according to the same division algorithm D ($a_D$) applied with the division argument $a_D$ which is used by the reference A (step 9). Assuming that the algorithm used to division and selection has been previously delivered and kept by each other.

The inquirer B receives the transmittal information block E from the reference A (step 10). Then, the inquirer B selects information elements according to the same selection algorithm S ($a_S$) applied with the selection argument $a_S$ which is used by the reference A (step 11), relocates the selected information elements with the information elements included in the transmittal information block E (step 12), and retrieves the electronic information $C_I$ having the original information form so as to compare with the recorded copy $C_B$. If the retrieved electronic information $C_I$ and the recorded copy $C_B$ has no difference, it can be decided with a probability tolerable in practical use that the recorded copies $C_A$ and $C_B$ has no difference.

When the electronic information is treated as a queue of bit data and divided physically at any points, if there is a difference between the both information, the succeeding information elements after the different position will be affected by the difference. According to the above method, it is easily decided if there is even a trivial difference in any position, because the information retrieved by replacing with the information elements included in the transmittal information will not coincide with the original copy and has no meaningful concepts as there lacks conformity at the inserting position.

The same method may be used for confirming a change in cipher keys.

Figure 3:
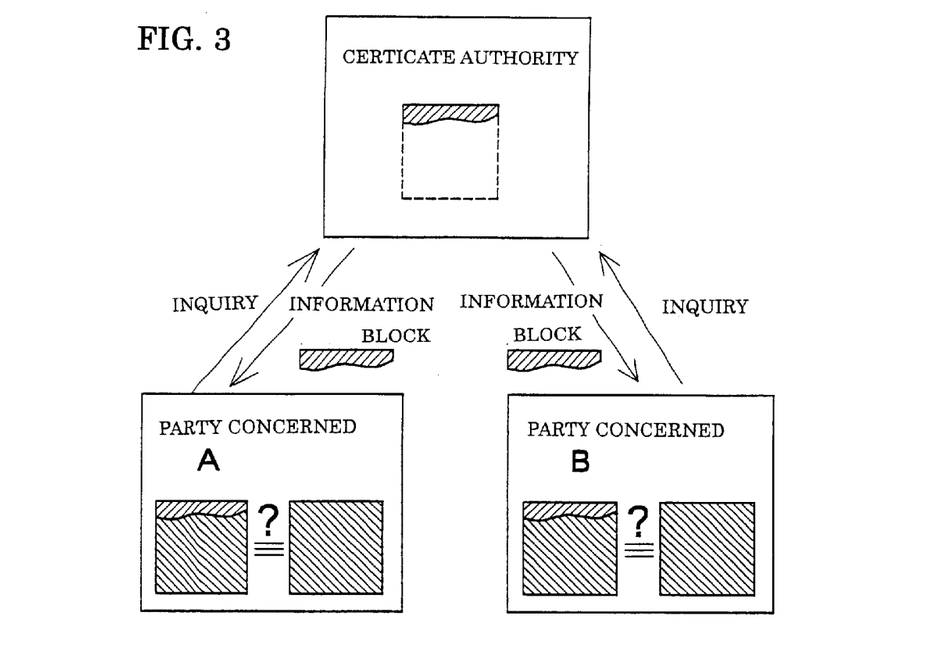
FIG. 3 is a block diagram indicating other example of using this invention.

FIG. 3 shows an example of the invention used for confirming genuineness of the contract via a certificate authority or a notary office.

The party A and the party B deposit the contract of agreement to the certificate authority. Any of them has a doubt in contents of the contract afterwards, he can confirm through the electronic information inquiry method of the invention that his recorded electronic information of the contract is the same as the copy deposited in the certificate authority.

When the certificate authority receives an inquiry of collation from the party concerned, acts as a reference to form a transmittal information block by dividing the recorded electronic information of the deposited contract into information elements and selecting adequate elements according to the division/selection algorithm, and send it to the inquirer together with the division/selection arguments.

The party concerned as the inquirer divides his recorded electronic information based on the predetermined algorithm with the arguments, and checks if his recorded electronic information is the same as the electronic information retrieved by replacing the indicated selected elements.

Thus, conformity of the electronic information recorded by both parties concerned can be confirmed only by exchanging very small part of the information elements.

The above method of the invention reduces load of the communications and demand of the information processing equipment's capability, and enables the certificate authority to process much more demands from clients. It is safe enough in communications, because only a part of the electronic information shall be sent.

The certificate authority may keep only the information blocks that are divided and selected with consent of the parties concerned, and send the information block at inquiry of collation. Even the above method can confirm if there exists change in electronic information recorded by the party concerned, and has an advantage that memory capacity required in the certificate authority is reduced.

The method may also be used in a mobile computer which copies electronic, information from a host computer and is carried with a user. The user may collate the electronic information to the host computer, and compare it with the electronic information in the mobile computer, so that even at a remote place he can confirm conformity of the recorded electronic information in the mobile computer with the original information.

Figure 4:
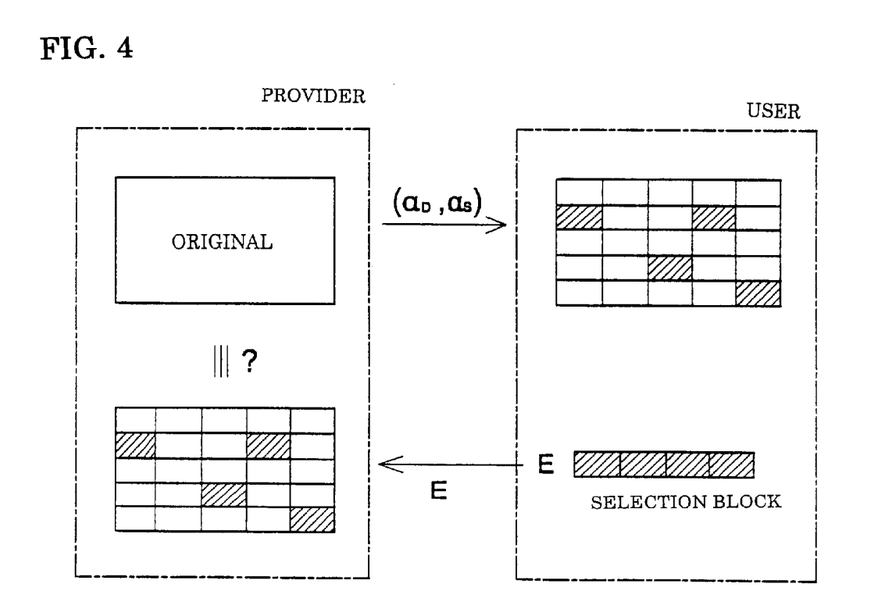
FIG. 4 is a block diagram illustrating another example of using this invention.

FIG. 4 is a block diagram illustrating the same collation inquiry method used by a software provider.

When data-bases or programs are delivered through communications channels, it is preferable to confirm that there is no change in electronic information of the software received by the clients. And it is convenient to monitor the software periodically so that the user would not use a falsified software for any reason. But it is difficult in commercial use to confirm genuineness of databases with vast capacity by transmitting the whole data, therefore the requirement has not been satisfied yet.

On the contrary, the collation inquiry method of the invention satisfies the requirement of the software providers.

A provider priorly inserts a division/selection algorithm in the programs and databases which are delivered to the users. When the provider sends the division/election arguments ($a_D$, $a_S$) to the user on command, the user divides the programs recorded as electronic information into several information elements, selects some of the elements based on an indicated algorithm, forms a selected block E, and sends it to the provider.

The provider divides the original copy of programs to be delivered into information elements according to the same algorithm, and replaces the information elements at the places selected according to the same algorithm with the information elements included in the selection block E. Thus the provider retrieves the electronic information. The provider can check if any falsification exists in programs managed by the user, by confirming difference between the retrieved electronic information with the original copy. The provider can confirm genuineness of the copy not by comparing the retrieved information with the recorded copy but only by checking that the retrieved information has any meaningful content.

According to the above-mentioned method, periodical checks can be executed in practical, because only very small information quantity should be exchanged.

The second electronic information inquiry process of the invention is to confirm genuineness of the users or the recorded information in shops or hospitals, characterized in that a user holds a part of the divided originals, and the user sends that part of the information to a certificate authority on demand of collation, and the certificate authority checks identity of the original information to the information combined with the received part and its remain part which is recorded in the certificate authority, and sends the result to the user.

Figure 5:
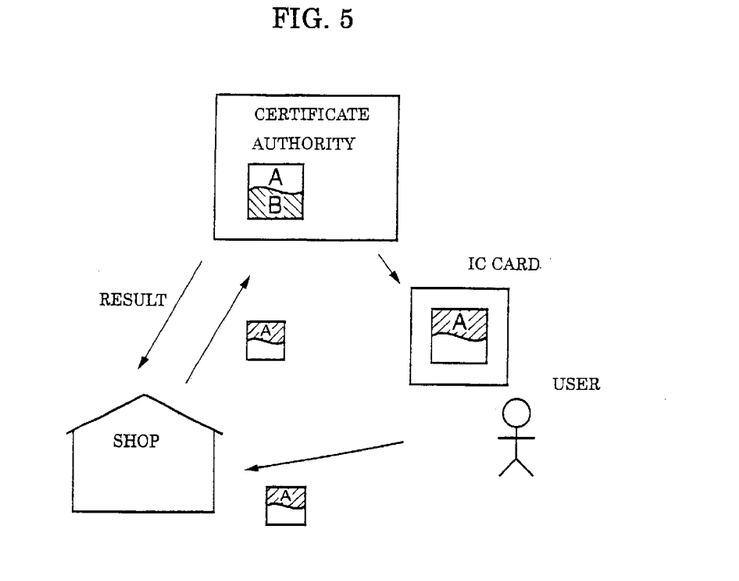
FIG. 5 is a block diagram illustrating the second embodiment of this invention.
Figure 6:
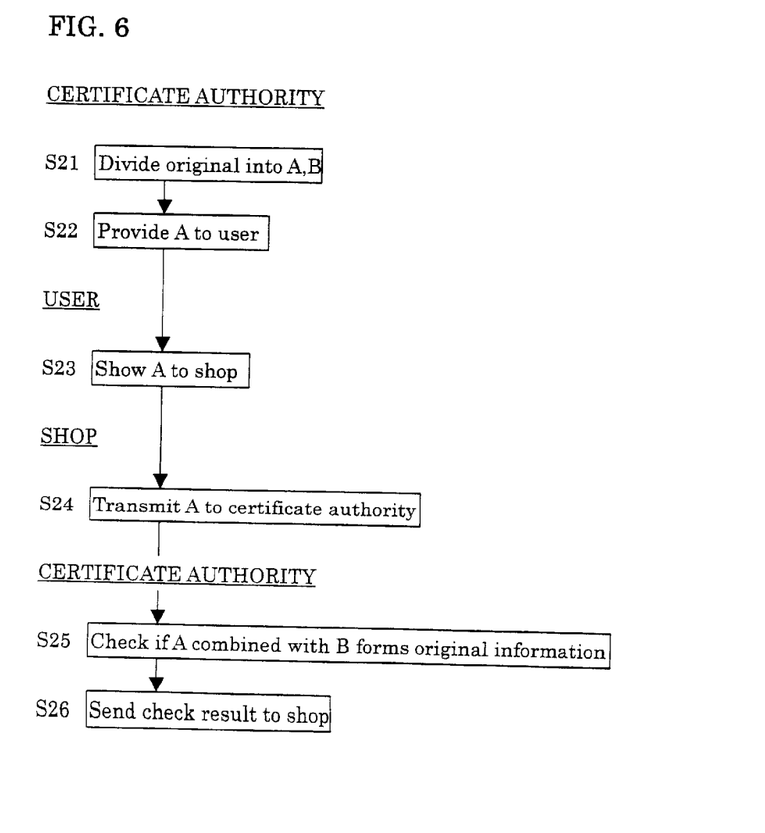
FIG. 6 is a flow diagram of the second embodiment.

FIG. 5 is a block diagram illustrating the second embodiment of the invention, and FIG. 6 is a flow diagram showing the procedure for using the second embodiment.

The certificate authority divides user's authentication information into a part A and a part B (step 21), records the first part A on an IC card, for example, and delivers the card to the user (step 22). The user buys items a shop and shows his card (step 23). The shop transmits the information part A recorded in the IC card to the certificate authority (step 24). The certificate authority combines the part A of the information received from the shop with the remain part B recorded in the authority, and checks its identity (step 25). He can authenticate genuineness of the IC card if combination of the information A recorded in the IC card and the information B in a memory device results in the original information. The check result is transmitted to the shop (step 26). The shop can make transactions trusting the check result.

The above credit inquiry method based on the divided information is also available in online merchandising. In an online merchandising, a memory device of user's computer is used instead of IC cards.

In the system of the second invention, the information kept by the user is only a divided part of the whole information, thus a third party cannot know the content of the original information if he can access the information recorded in the user's device. And it is safe enough in a communications traffic because very small portion of the information and the check result only are transmitted through the communications channel between the certificate authority and the shop.

Though FIG. 5 indicates the certificate authority confirms genuineness by combining the information from the both sides, the shop itself may confirm the genuineness receiving the rest of the information from the certificate authority.

Figure 7:
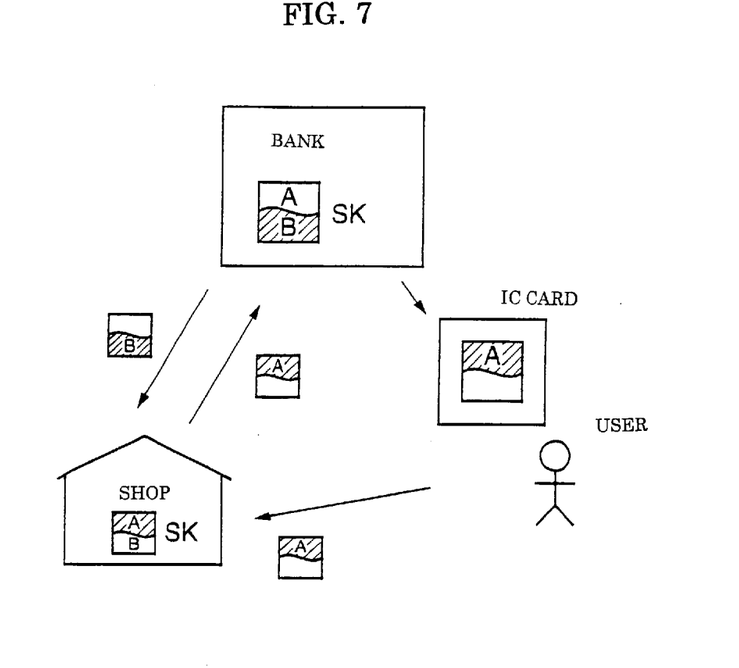
FIG. 7 is a block diagram of other example of using the second embodiment.

FIG. 7 is a block diagram showing the second embodiment is applied to certification by a bank.

The bank divides the secret key SK into two parts A and B, delivers a cash, card written with the first part A to the depositor, and records the second part B in a database held in his memory device. Such a cash card is convenient for retrieval that is written with the database address of the bank where the rest part of the secret key SK is located.

When a depositor merchandises in a shop, he provides the card to a terminal device in the shop. The terminal device of the shop reads the first fragment A written in the cash card and sends it to the bank. The bank combines it with the other fragment B kept in himself so as to retrieve the secret key SK.

On the contrary, the shop inquires the bank to receive the second fragment B of the secret key SK recorded in the bank and retrieves the secret key SK by combining the fragment B and the other fragment A which is provided by the depositor.

The bank and the shop can exchange information using the common secret key SK.

According to the above-mentioned method, two information fragments are combined to form the secret key SK only when it is actually required to exchange information, thus it is safe because there is no secret key in usual.

The secret key SK may be reproduced every time when information exchange is finished by freshly dividing the key and delivering them again to the database of the bank and the IC card of the depositor. The terminal device of the shop can rewrite the cash card. In this case, it is preferable for the bank to destroy the part which is delivered to the depositor, so that there is no complete form of the secret key anywhere for security. Or they may reform new secret key, divide it and distribute them to the parties, if necessary. If the secret key is reproduced every after inquiry, security of information management is enforced.

The method of this embodiment can form a virtual private traffic in the public communications network, so that it may be used for delivering secret keys which are distributed only to the contracted audiences of such as satellite broadcasting and used to receive closed programs. And also it can be applied for content providers to distribute programs only to their designated users.

Figure 8:
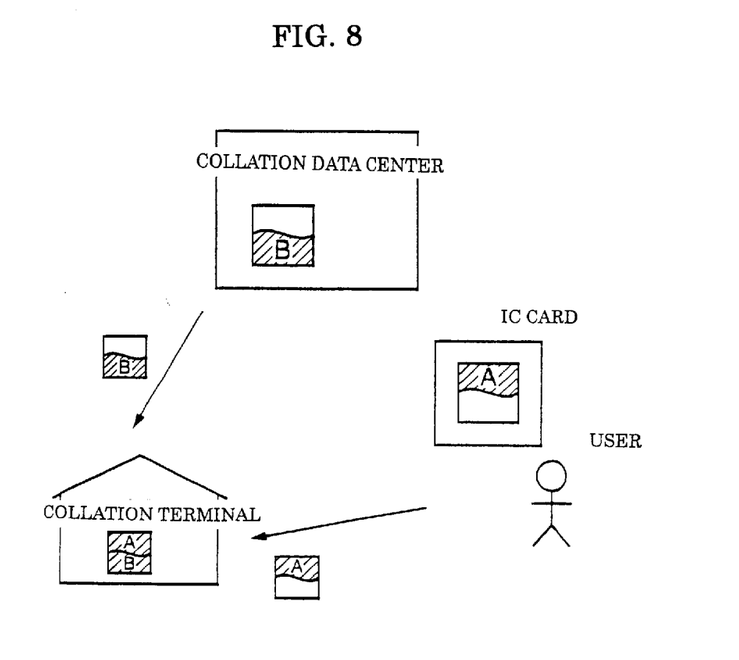
FIG. 8 is a block diagram illustrating another example of using the second embodiment.

FIG. 8 is a block diagram illustrating an application in which information delivered by a user is combined with information supplied from a reference data center. The user carries a card written with a fragment A of the information, and the reference data center maintains the remaining fragment B of the information. Shops or the like which need collations furnish collation terminals.

When a user merchandises in a shop, the user provides the shop the information fragment A recorded in the card. The collation terminal receives the remaining information B stored in the collation data center, and combines and retrieves the complete information A+B.

Such system is available in automated teller machines which obtains user authentication by themselves using confirming facility of genuineness of the cards.

The electronic information inquiry process of the invention is, applicable to medical sheets. A family doctor provides an IC card to the patient in which the doctor records information of the patient's medical sheet lacking a specific part of the medical sheet. Any third party cannot read the content of the medical sheet exactly from the IC card. When the patient shows the IC card to other doctor on a journey, the doctor requests collation to the family doctor who issues the IC card. Then the family doctor sends the other doctor the information which makes up the lacking portion of the medical sheet. The other doctor can certificate the patient and make an adequate diagnosis and treatment referring to the retrieved medical sheet.

The IC card recording medical sheet according to the invention has high confidentiality as anyone cannot read out content of the medical information from the card. And increasing the ratio of the medical information to be recorded in the card, decreasing quantity of information to be transmitted through the communications channel so that communication time is saved and data is secured in communications.

In the above description, the inquirer and the reference are different information processing devices, though the inquirer and the reference may exist in the same computer in applications of the invention. Making contents un-retrievable of keys of cryptography, ID signs, passwords, and so on, security of the recorded information is much improved. It is preferable for the reference to be a removable memory medium which computer hackers hardly attack.

Other easily portable, usual media such as floppy disks instead of IC cards may be used as the memory media recording divided information. The information may be converted to bar codes and record on paper media.

Industrial Applicability

As described in detail above, according to the electronic information inquiry process of the invention, genuineness of the electronic information files kept in the inquirer can be determined only by transmitting electronic information blocks made from only small portion of the recognized electronic information. Therefore, confirmation between the parties concerned or collation through a certificate authority are highly secured against leakage of information during communications and can be easily executed with a light traffic load of communications.

What is claimed is:

1. An electronic information inquiry method, comprising:

connecting an inquirer and a reference through a communications channel;

the reference determining an argument, dividing a first electronic information which is stored by the reference into more than one information element based on a dividing algorithm applied with said argument, selecting information elements from said divided elements and generating a transmittal information block relocating said selected elements based on a selecting algorithm applied with said argument, and sending said transmittal information block and said argument to said inquirer; and the inquirer receiving said transmittal information block and said argument, dividing a second electronic information which is stored by the inquirer into more than one information element based on the same dividing algorithm as used by the reference applied with said argument, selecting a part of said divided elements based on the same selecting algorithm applied with said argument, replacing said selected elements with the information elements included in said transmittal information block to generate a third electronic information, and comparing said third electronic information and the second electronic information.

2. The electronic information inquiry method according to claim 1, wherein said information element is formed by dividing physically the electronic information having a bit data format.

3. The electronic information inquiry method according to claim 2, wherein said argument is formed based on a value relating to a time on request of inquiry.

* * * * *